May 15, 1928. 1,670,179
C. ANDREINI
WINDMILL TRANSMISSION DRIVE
Original Filed May 24, 1923    2 Sheets-Sheet 2

Inventor
Corrado Andreini
H. B. Willson & Co.
Attorneys

Patented May 15, 1928.

1,670,179

UNITED STATES PATENT OFFICE.

CORRADO ANDREINI, OF ROME, ITALY.

WINDMILL TRANSMISSION DRIVE.

Original application filed May 24, 1923, Serial No. 641,218, and in Italy January 24, 1923. Divided and this application filed January 8, 1925. Serial No. 1,272.

The present invention relates to improvements in devices for transmitting windmill power to machines substantially consisting in that the upper lengths of two wire cables run on two fixed pulleys and through the flanges of a sleeve operated up and down by the fly-wheel, said lengths being then fixed to the said flanges, while the lower lengths descend vertically down the main beam of the tower, the upper and lower lengths being connected by means of U-shaped tubular pieces keeping the parallel ends of cables at the same distance existing between the pulleys and sleeve's flanges, in the middle of both U-shaped tubular pieces, rods being fixed transmitting the motion to the machine to be driven.

The device according to the invention has the advantage, even when the efficiency of the windmill is great, to work noiselessly and to be of a simple construction.

The invention is illustrated by way of example in the accompanying drawings in which:

Fig. 3 is a plan view on a larger scale and

Figure 1:
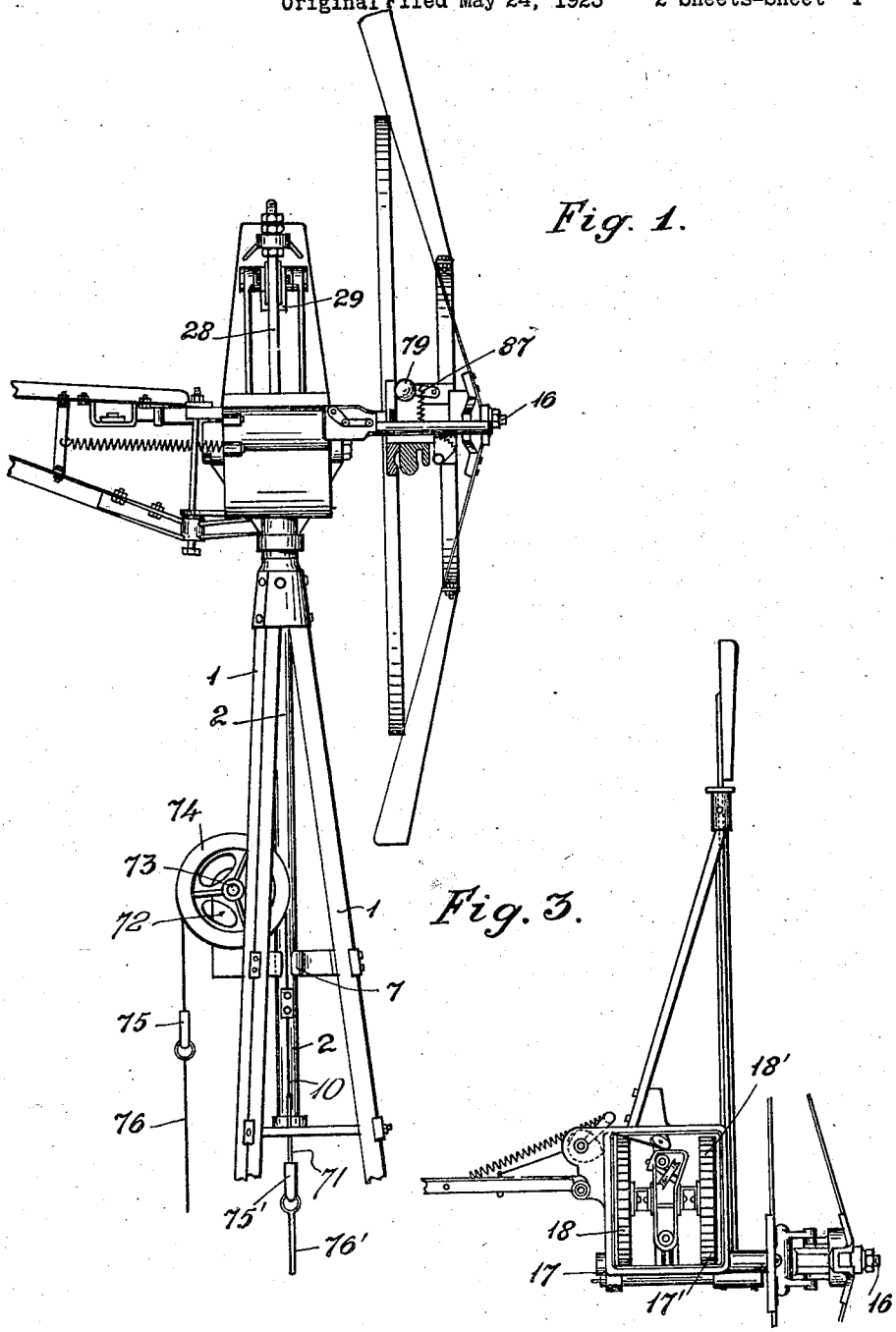
Fig. 1 shows a side view.

The wind-wheel shaft (16) is provided with two toothed wheels (17) (Fig. 3) in mesh with toothed wheels (18), on which the pivots of connecting rods (37) (Fig. 2) are secured, these rods being at the other end articulated to slide block (29) (Figs. 1, 2, 4), the block sliding by means of pulleys (38) along the guides (28). The gear ratio between toothed wheels 17 and 18 (Fig. 3) varies according to the diameter of the wind-wheel, so that whatever may be the species of windmill the ratio between the number of teeth of wheels 17 and the main wheels is nearly always constant and each tooth successively is in mesh with different teeth of the driving wheels, so that the unavoidable wear of the teeth is the same for all of them.

The constant gear ratio for all species of windmills is calculated on the base of the greatest speed of 14 meters per second the wind-wheel may have and in such a way that, for instance in the case of a pump, in each cylinder a stroke of piston corresponds to said speed, so that the efficiency of the pumps in the case of extraordinary velocities does not diminish.

The slide-block 29 is fixed to the tube 67 (Fig. 4) coaxial with main tubular column 2, the tube at the bottom end bearing a sleeve 68 freely rotatable around tube 67 and not liable to be shifted longitudinally, this movement being prevented by a screw.

The external flanges $70$—$70^1$ of sleeve 68 (Fig. 4) projecting through slots (10) of main tubular column 2 (Figs. 1–2) are provided with longitudinal apertures and firmly connected by press screws with wire cables 71 (Figs. 1–4) running through the apertures.

Figure 2:
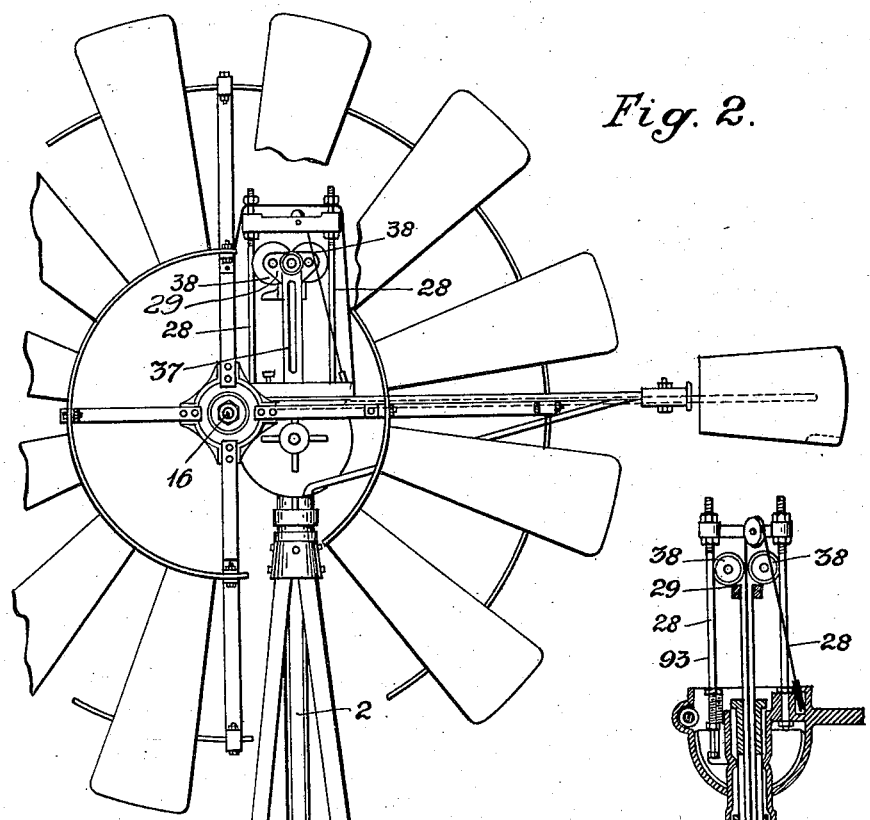
Fig. 2 is a front view of the upper part of the windmill.

The tie rod 7 (Figs. 1–2) between uprights 1—1 of the tower is provided with an oil feeder 72 and the bearing for a shaft 73, two rope pulleys $74$—$74^1$ (Figs. 1–2) being wedged thereon, the main tubular column 2 of the tower being between these pulleys. The vertical internal tangents to the grooves of these two pulleys ($74$—$74^1$ Figs. 1 and 2) coincide with the axis of the bore of flanges $70$—$70^1$; the lower lengths of cable 71 running down vertically along the tubular column 2. Both upper and lower lengths of cable 71 run through two semi-circular shaped tubular pieces $75$—$75^1$ (Figs. 1–2). The lengths of the vertical sections of cables 71 are on same plane passing through the axis of the pivot for the vertical internal tangents to the grooves of the pulleys 74 and $74^1$ and the axis of the bores of flanges $70$—$70^1$. In the center of the semicircular tubular pieces there are secured two rods 76 and $76^1$ for the transmission of motion.

Figure 4:
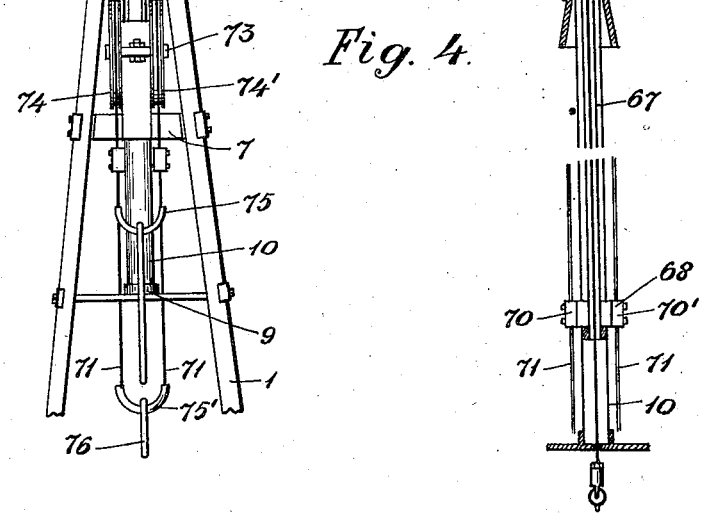
Fig. 4 is a schematic sectional view of the device.

The device works as follows:

The wind-wheel by turning round drives the slide-block 29 up and down, this motion being transmitted to the hollow rod 67 and sleeve 68 (Fig. 4). When sleeve 68 is going up both lower lengths of cable 71 (Figs. 2 and 4) are directly drawn upwards, so that the U-shaped tubular piece 75 (Figs. 1–2) moves the same stretch downwards. When slide-block 68 is going downwards the contrary takes place, i. e. tubular piece $75^1$ moves an equal stretch downwards and tubular piece $75^1$ upwards. Through the rods $76$—$76^1$ the motion is transmitted to the machine, for instance a pump, arranged down below in the tower.

The device is well balanced, the transmission of motion even in the case of very efficient windmills takes place in a simple, noiseless and sure way.

Having now particularly described and ascertained the nature of my said invention and in what manner the same is to be performed I declare that what I claim is:

1. In a windmill transmission drive, a slidably mounted block, means for vertically reciprocating said block, a tube connected at its upper end with said block, a sleeve carried by the lower end of said tube, a pair of suitably mounted pulleys, cables passing over said pulleys, the lengths of said cables on one side of said pulleys being connected to said sleeve whereby the reciprocating movement transmitted thereto by said sleeve and block will exert an upward and downward pull on said cables alternately and power transmitting rods connected to the opposite ends of said cables.

2. In a windmill transmission drive, a slidably mounted block, a pair of driving wheels geared to the shaft of the windmill wheel, driving rods connected eccentrically with said wheels and with said block whereby the same is reciprocated by said windwheel, a vertically disposed elongated tube connected at its upper end with said block, a sleeve carried by the lower end of said tube, a pair of suitably mounted pulleys, cables passing over said pulleys, the lengths of said cables on one side of said pulleys being connected to said sleeve whereby the reciprocating movement transmitted thereto by said sleeve and block will exert an upward and downward pull on said cables alternately and power transmitting rods connected to the opposite ends of said cables.

3. In a windmill transmission drive, a slidably mounted block, means for vertically reciprocating said block, a tube connected at its upper end with said block, a sleeve carried by the lower end of said tube, a pair of suitably mounted pulleys, cables passing over said pulleys, the lengths of said cables on one side of said pulleys being connected to said sleeve whereby the reciprocating movement transmitted thereto by said sleeve and block will exert an upward and downward pull on said cables alternately, tubular semi-circular members engaged with the opposite ends of said cables and power transmitting rods loosely connected at their upper ends with said semi-circular members.

4. In a windmill transmission drive a main tubular column having near its lower end vertical slots, a guide arranged at the upper end of said column, a block, pulleys mounted on said block and engaging said guide, an elongated tube connected at its upper end with said block and extending downwardly through said tubular column, a sleeve carried by the lower end of said elongated tube, flanges on said sleeve projecting through the vertical slots in said main column, means for vertically reciprocating said block in said guide together with said tube and sleeve, a pair of suitably mounted grooved pulleys, cables passing over said pulleys and connected with the flanges of said sleeve whereby said cables are pulled first upwardly and then downwardly over said pulleys and power transmitting rods connected with the ends of said cables.

In testimony whereof I have hereunto signed my name.

CORRADO ANDREINI.